United States Patent
Kuenemund et al.

(10) Patent No.: US 11,463,074 B2
(45) Date of Patent: Oct. 4, 2022

(54) STORAGE ELEMENT WITH CLOCK GATING

(71) Applicant: Infineon Technologies AG, Neubiberg (DE)

(72) Inventors: Thomas Kuenemund, Munich (DE); Thomas Poeppelmann, Munich (DE)

(73) Assignee: Infineon Technologies AG, Neubiberg (DE)

( * ) Notice: Subject to any disclaimer, the term of this patent is extended or adjusted under 35 U.S.C. 154(b) by 85 days.

(21) Appl. No.: 17/070,086

(22) Filed: Oct. 14, 2020

(65) Prior Publication Data

US 2021/0143802 A1    May 13, 2021

(30) Foreign Application Priority Data

Nov. 11, 2019 (DE) .......................... 102019130395.8

(51) Int. Cl.
| | | |
|---|---|---|
| *H04L 9/30* | (2006.01) | |
| *H04L 9/40* | (2022.01) | |
| *G09C 1/00* | (2006.01) | |
| *H03K 3/012* | (2006.01) | |
| *H04L 9/00* | (2022.01) | |
| *H04L 9/14* | (2006.01) | |
| *H03K 3/3562* | (2006.01) | |
| *H04L 9/06* | (2006.01) | |

(Continued)

(52) U.S. Cl.
CPC ........... *H03K 3/038* (2013.01); *H04L 9/0618* (2013.01); *H04L 9/0852* (2013.01); *H04L 9/3066* (2013.01); *H04L 63/0435* (2013.01); *H04L 63/0442* (2013.01)

(58) Field of Classification Search
CPC ... H04L 9/0618; H04L 9/0852; H04L 9/3066; H04L 9/002; H04L 9/14; H04L 63/0435; H04L 63/0442; H04L 2209/12; H03K 3/038; H03K 3/35625; H03K 3/12; G09C 1/00

See application file for complete search history.

(56) References Cited

U.S. PATENT DOCUMENTS

2006/0026543 A1 *  2/2006  Jayaraman .......... G06F 30/3312
                                                         716/108
2014/0068231 A1    3/2014  Saeki
(Continued)

OTHER PUBLICATIONS

Clock gating—A power optimizing technique for VLSI circuits, by J Shinde) (Year: 2011).*

(Continued)

*Primary Examiner* — Vu V Tran
(74) *Attorney, Agent, or Firm* — Banner & Witcoff Ltd.

(57) ABSTRACT

A storage element that is operable based on a system clock signal, the storage element including a clock gating circuitry configured to generate a gated clock signal based on at least one Boolean signal and the system clock signal or a pre-processed system clock signal, wherein the clock gating circuitry comprises physical connections of small capacitance such that tapping of at least one of the physical connections results in a hold-time violation. Also, a hardware-based cryptography accelerator or a secured processing system including at least one such storage element, and a method for operating at least one storage element.

14 Claims, 7 Drawing Sheets

(51) Int. Cl.
*H04L 9/08* (2006.01)
*H03K 3/038* (2006.01)

(56) References Cited

U.S. PATENT DOCUMENTS

| | | | |
|---|---|---|---|
| 2015/0042375 A1* | 2/2015 | Fuller | H03K 3/0375 |
| | | | 326/8 |
| 2015/0104198 A1* | 4/2015 | Dorren | H04L 7/0276 |
| | | | 398/202 |
| 2016/0087611 A1 | 3/2016 | Sharma et al. | |
| 2017/0060669 A1 | 3/2017 | Rohleder et al. | |
| 2017/0160112 A1* | 6/2017 | Guilley | G01R 31/3016 |
| 2018/0349600 A1* | 12/2018 | Elenes | G06F 21/725 |
| 2019/0004770 A1* | 1/2019 | Satpathy | H04L 9/3252 |
| 2019/0004812 A1* | 1/2019 | Melton | G06F 9/3871 |

OTHER PUBLICATIONS

German Patent Office, Office Action issued for DE 102019130395. 8, 5 pgs., dated Aug. 27, 2020.

* cited by examiner

STORAGE ELEMENT WITH CLOCK GATING

TECHNICAL FIELD

Embodiments of the present disclosure relate to a storage element with modified clock gating.

BACKGROUND

WRITE ENABLE signals are often subject to probing attacks. This in particular applies for WRITE ENABLE signals for (multi-bit) custom registers and in scenarios with address bit combinations that reveal information about cryptographic key bits. An attacker may be able to observe in a transparent manner known address-gated clock signals, which are therefore preferred targets of attacks, in particular for high fan-out clock gate outputs.

SUMMARY

Hence, it is an object of this disclosure to improve existing solutions to become more robust against probing attacks and, in particular, impair reading or reconstructing cryptographic information based on such probing attacks.

This is solved according to the features of the independent claims. Further embodiments result from the depending claims.

The examples suggested herein may in particular be based on at least one of the following solutions. Combinations of the following features may be utilized to reach a desired result. The features of the method could be combined with any feature(s) of the device, apparatus or system or vice versa.

A storage element is provided that is operated based on a system clock signal, wherein the storage element comprises
- a clock gating circuitry generating a gated clock signal based on
  - at least one Boolean signal and
  - the system clock signal or a preprocessed system clock signal,
- wherein the clock gating circuitry comprises physical connections of small capacitance such that tapping of at least one of the physical connections results in a hold-time violation.

The dedicated clock gating circuitry bears the additional advantage that a reduced amount of wiring effort is required thereby increasing its robustness against probing attacks and increasing the level of security for the device.

The small capacitance may be in the order of one femto Farad.

According to an embodiment, the gated clock signal comprises a true gated clock signal and an inverse gated clock signal.

Hence, the gated clock signal may be one gated clock signal and its inverse gated clock signal.

According to an embodiment, at least one of the clock gating circuitry or the storage element comprises a tri-state circuitry, in particular a C2MOS or transmission gate circuitry.

According to an embodiment, the at least one Boolean signal is provided by a Boolean circuitry, which is based on at least two input signals and provides an output signal as a function on the at least two input signals.

According to an embodiment, the Boolean circuitry is realized for each combination of binary values associated with the at least two input signals.

According to an embodiment, the storage element comprises at least one of the following:
- a Flip-Flop,
- a storage device that may be controlled by complementary (gated) clock signals,
- a memory device,
- a register or a latch.

According to an embodiment, the storage element further comprises a buffer stage that provides
- a first clock signal that is in-phase with the system clock signal and
- a second clock signal that is inverted to the phase of the system clock signal.

According to an embodiment, the buffer stage supplies the first clock signal and the second clock signal to the clock gating circuitry as preprocessed system clock signal.

According to an embodiment, the small capacitance is in the order of a few femto Farad, in particular below 10 fF.

According to an embodiment, the storage element is part of or used in association with a hardware-based cryptography accelerator or a secured processing system.

According to an embodiment, the hardware-based cryptography accelerator or the secured processing system provides at least one of the following cryptographic schemes:
- a block cipher,
- a symmetric cryptographic algorithm,
- an asymmetric cryptograph algorithm,
- Elliptic Curve Cryptography,
- Post-quantum cryptography.

Also, a hardware-based cryptography accelerator or a secured processing system is provided, which comprises at least one storage element as described herein.

Further, a method is suggested for operating the storage element as described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION

Examples described herein in particular suggest counter measures that combine an integration of a decoder and/or a demasking logic into clock gates and/or an integration of these decoder/demasking clock gates into (multi-bit) latches or flip-flops.

This advantageously enables a secure intra-cell wiring of critical plain signals as well as a reduced amount of wiring capacitances that results in a hold-time violation when exposed to a probing attack.

The hold-time violation is a violation of a hold-time requirement. For example, for Deep-Sub-Micron technologies a minimum hold-time may be required to amount to 50 ps (picoseconds). If the probing enters a capacity into the circuitry that extends the hold-time by 100 ps to 150 ps, this may introduce a delay that does no longer ensure the correct output data stored, e.g., in a latch of Flip-Flop. More details about the hold-time violation are described in, e.g., https://www.edn.com/design/analog/4371393/Understanding-the-basics-of-setup-and-hold-time. It is noted that the terms "synchronous Flip-Flop", "Master-Slave-Flip-Flop" may be referred to as "Flip-Flop". Also, the term Flip-Flop may refer to a register.

Also, examples described herein suggest implementations that increase the overall difficulty for a successful reverse engineering. This is always beneficial when it comes to circuitry that is subject to security, in particular to cryptographic operations.

It is in particular an option that a demasking and/or a decoding clock gating circuitry is integrated within storage elements that need to be protected.

Figure 1:
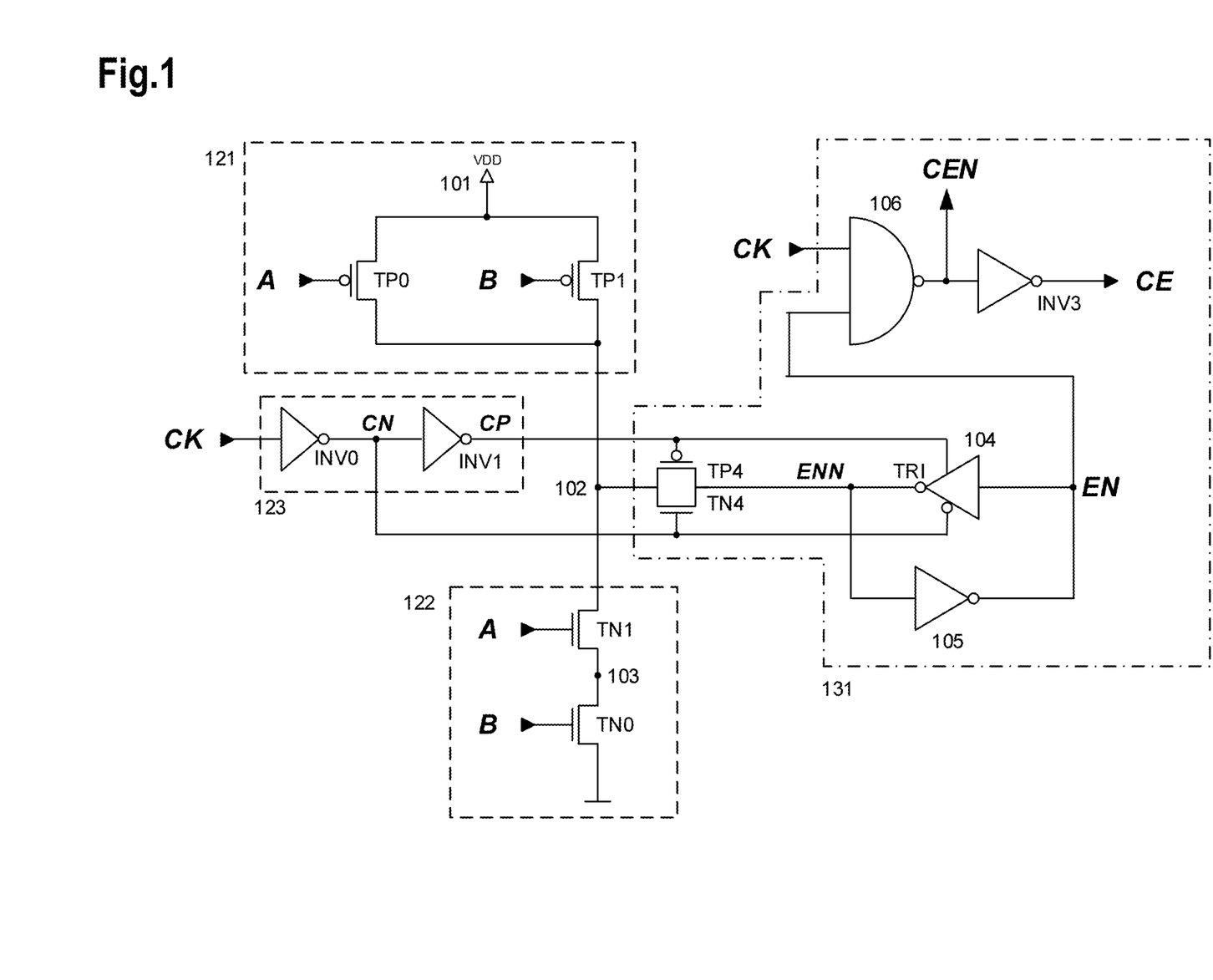
FIG. 1 shows an exemplary circuitry comprising a NAND decoder stage that is integrated with a clock gate circuitry.

FIG. 1 shows an exemplary circuitry comprising a NAND decoder stage that is integrated with a clock gate circuitry.

The clock gate circuitry provides a functionality that may only be enabled for a particular set of registers or latches.

Hereinafter, "PMOS" may refer to a PMOS device or PMOS transistor and "NMOS" may refer to a NMOS device or NMOS transistor.

An input A is connected to the gate of a PMOS TP0, which is connected between a node 101 and a node 102. An input B is connected to the gate of a PMOS TP1, which is connected between the node 101 and the node 102.

It is noted that "connected between node a and node b" means that the terminals source and drain are connected between the node a and the node b or between the node b and the node a.

The node 101 may be connected to a positive supply voltage VDD.

The input A is connected to the gate of a NMOS TN1, which is connected between the node 102 and a node 103. The input B is connected to the gate of a NMOS TN0, which is connected between the node 103 and ground. In other words, the NMOS TN1 and the NMOS TN0 are connected in series, wherein the NMOS TN1 is connected to the node 102 and the NMOS TN0 is connected to ground.

A clock signal is applied to a node CK, which is connected to the input of an inverter INV0. The output of the inverter INV0 is connected to a node CN. The node CN is connected to the input of an inverter INV1. The output of the inverter INV1 is connected to a node CP.

The node CP is connected to the gate of a PMOS TP4 and to a C2MOS inverter 104. The node CN is connected to the gate of a NMOS TN4 and to the C2MOS inverter 104.

The C2MOS inverter is also connected to a node ENN and to a node EN.

The PMOS TP4 and the NMOS TN4 each is connected between the node 102 and the node ENN.

The node ENN is connected to the input of an inverter 105. The output of the inverter 105 is connected to the node EN.

The node EN is connected to the first input of a NAND gate 106. The second input of the NAND gate 106 is connected to the node CK. The output of the NAND gate 106 is connected to a node CEN and to the input of an inverter INV3. The output of the inverter INV3 is connected to a node CE.

Figure 2:
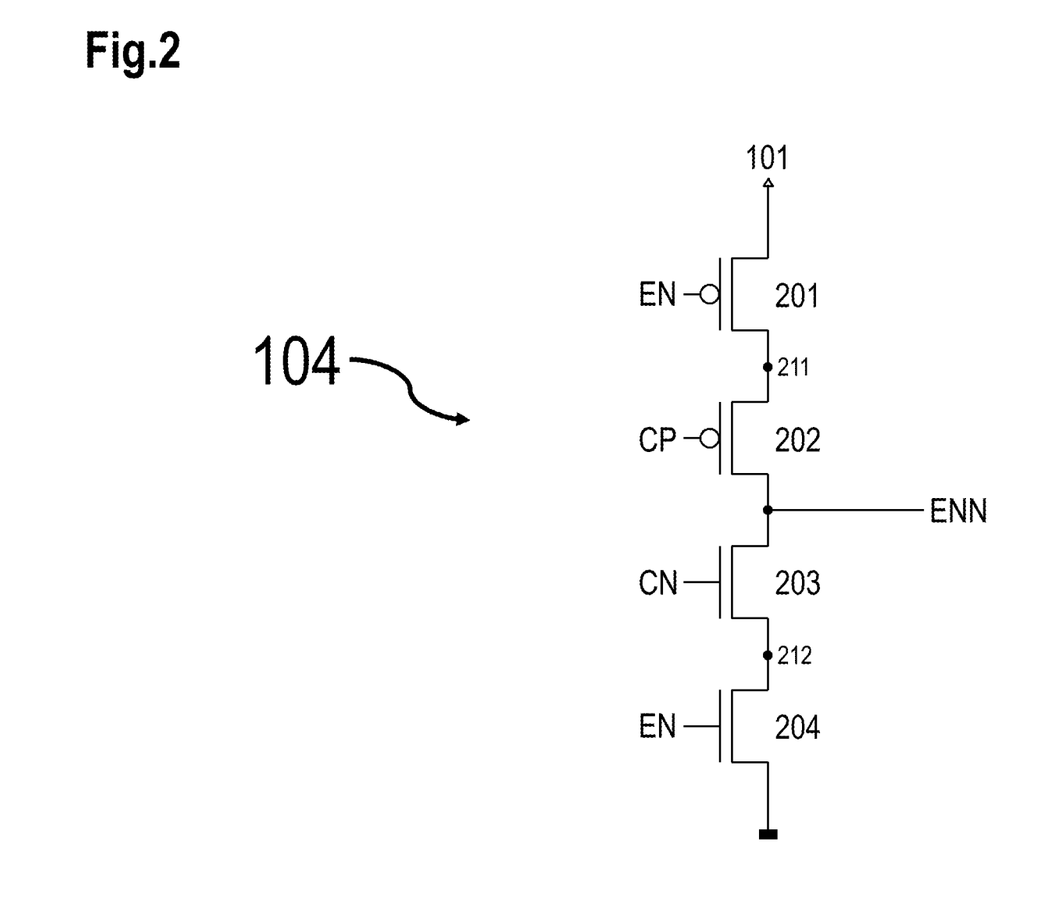
FIG. 2 shows an exemplary implementation of the C2MOS of FIG. 1.

FIG. 2 shows an exemplary implementation of the C2MOS 104 comprising two PMOS 201, 202 and two NMOS 203, 204.

The gate of the PMOS 201 is connected to the node EN. The PMOS 201 is connected between the node 101 and a node 211. The gate of the PMOS 202 is connected to the node CP. The PMOS 202 is connected between the node 211 and the node ENN. The gate of the NMOS 203 is connected to the node CN. The NMOS 203 is connected between the node ENN and a node 212. The gate of the NMOS 204 is connected to the node EN. The NMOS 204 is connected between the node 212 and ground.

Figure 3:
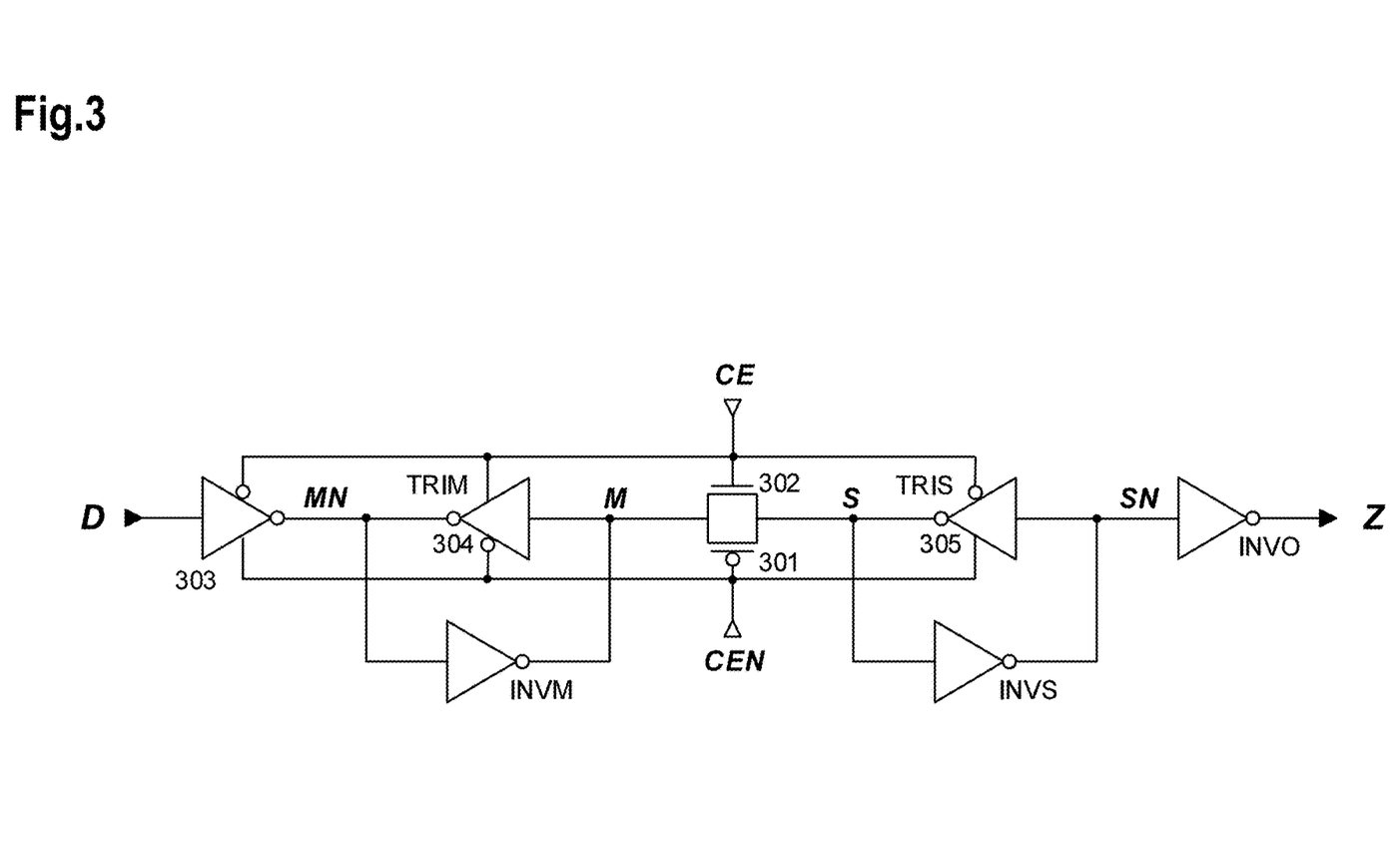
FIG. 3 shows an exemplary C2MOS master-slave register.

FIG. 3 shows an exemplary C2MOS master-slave register, wherein the signals conveyed via the nodes CE and CEN of FIG. 1 are gated clock signals.

The node CEN is connected to the gate of a PMOS 301 and to several C2MOS circuits 303 to 305. The PMOS 301 is connected between a node M and a node S.

The node CE is connected to the gate of a NMOS 302 and to each of the C2MOS circuits 303 to 305. The NMOS 301 is connected between the node M and the node S.

The C2MOS 304 is connected to the node M and to a node MN. The C2MOS 303 is connected to a node D and to the node MN. The C2MOS 305 is connected to the node S and to a node SN.

The input of an inverter INVM is connected to the node MN and the output of the inverter INVM is connected to the node M.

The input of an inverter INVS is connected to the node S and the output of the inverter INVS is connected to the node SN.

The input of an inverter INVO is connected to the node SN and the output of the inverter INVO is connected to a node Z.

Figure 4A:
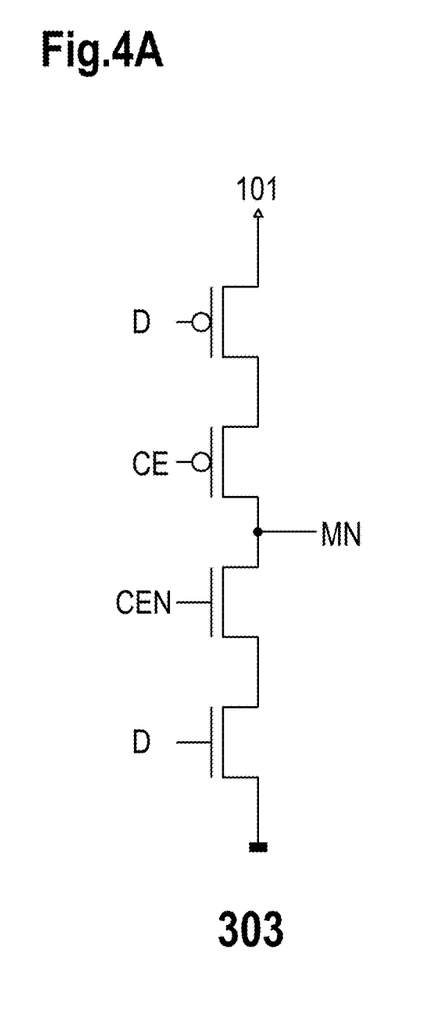
FIG. 4A shows an exemplary implementation of the C2MOS 303 of FIG. 3.
Figure 4B:
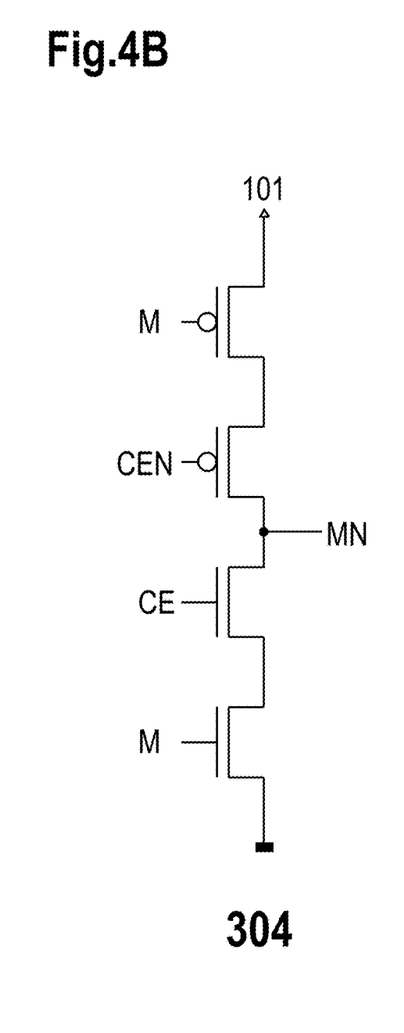
FIG. 4B shows an exemplary implementation of the C2MOS 304 of FIG. 3.
Figure 4C:
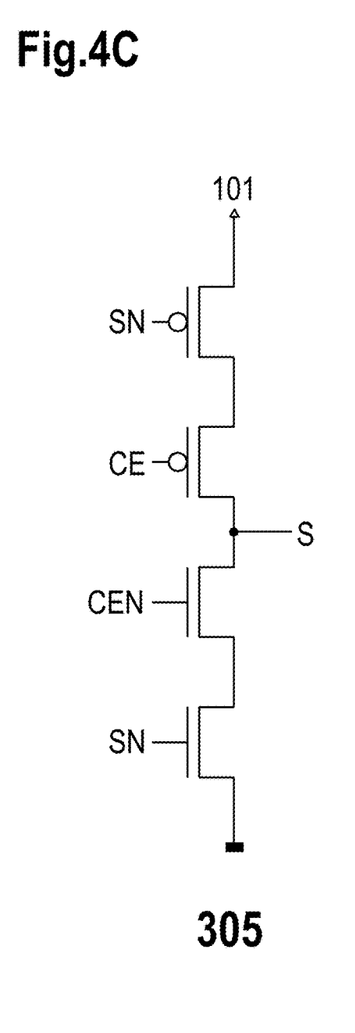
FIG. 4C shows an exemplary implementation of the C2MOS 305 of FIG. 3.

FIG. 4A shows an exemplary implementation of the C2MOS 303, FIG. 4B shows an exemplary implementation of the C2MOS 304 and FIG. 4C shows an exemplary implementation of the C2MOS 305.

The functionality of the circuitry shown in FIG. 1 to FIG. 4C can be described as follows:

A NAND decoder stage 121, 122 is connected to the node 102. The signals at the inputs A and B may be two address bits, the clock signal applied at the node CK may be a system clock and the signal obtained at the node CE is the gated clock signal (with the signal at the node CEN being the inverse gated clock signal): If the clock signal is "1" (also referred to as high), the gated clock signal at the node CE results in $$A \cdot B,$$

wherein "·" indicates a logical AND.

A buffer 123 comprising the inverters INV0 and INV1 is used to deload the system clock applied to the node CK. The signal at the node CP is thus in sync with the system clock and the signal at the node CN corresponds to the inverted system clock.

The following table summarizes various signals at the nodes shown in FIG. 1:

| CP | CN | ENN (inverted signal at node EN) |
|---|---|---|
| 0 | 1 | $\overline{A \cdot B}$ |
| 1 | 0 | The node ENN is driven by the C2MOS inverter 104 with the Boolean value "NAND(A, B)" that has been written previously to the clock gate latch, i.e. with the previous clock phase CK = 0 and CP = 0 and CN = 1. |

Hence, in the example shown in FIG. 1, a logical function f(A, B) depending on the input signals A and B is applied to the node 102.

The gated clock signals are in particular generated by a block 131. Here, at least one of the connections between
 the transistors TP4, TN4 and the C2MOS inverter 104,
 the transistors TP4, TN4 and the inverter 105,
 the inverter 105 and the NAND gate 106,
 the C2MOS inverter 104 and the NAND gate 106,
 the NAND gate 106 and the transistor 301,
 the NAND gate 106 and the inverter INV3,
 the inverter INV3 and the transistor 302
is preferably "capacitive short", which means that each of the connection has a capacitance that is by a factor 25 to 50 smaller than the capacitance of common connections. For example, the capacitance for each of the connections may be below 1 fF (femto Farad). Hence, any external tapping towards any of these connections leads to a hold-time violation and may therefore render the attack useless.

FIG. 3 shows the C2MOS master-slave register utilizing the gated clock signals applied via the nodes CE and CEN. Hence, the solution presented may be integrated into at least one Flip-Flop or at least one latch.

Input data may be applied to the node D and stored data may be available at the node Z.

Figure 5:
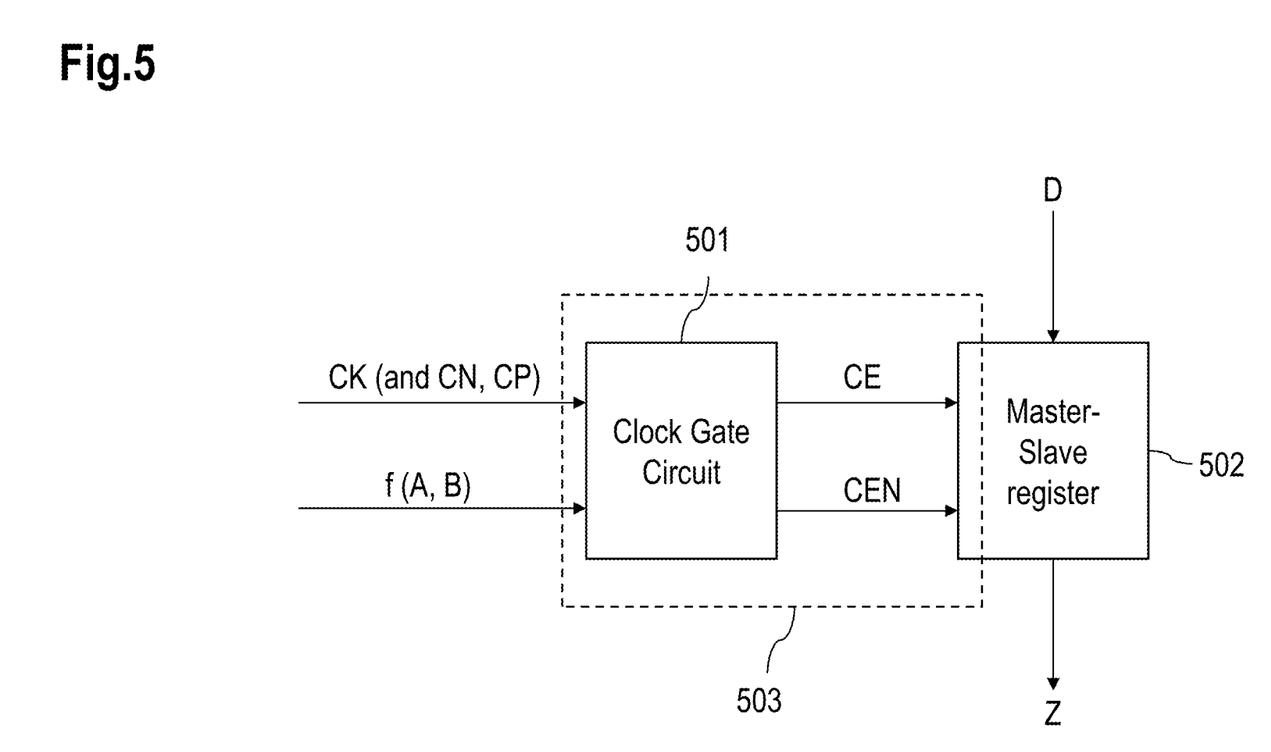
FIG. 5 shows a block diagram comprising a clock gate circuit that supplies gated clock signals towards a master-slave register.

FIG. 5 shows a block diagram comprising a clock gate circuit 501 that supplies gated clock signals via the nodes CE and CEN towards a master-slave register 502, which may be realized as a Flip-Flop or latch. However, the gated clock signals may be supplied towards any Flip-Flop, latch or storage device that may be controlled by such complementary (gated) clock signals.

Inputs to the clock gate circuit 501 are the system clock that is supplied via the node CK. Also, buffered clock signals that are derived from the system clock may be supplied via the nodes CN and CP.

In addition, a result of a logical (Boolean) function f(A, B) is supplied to gate the clock gate circuit 501. In the example of FIG. 5, the function f is based on two inputs A and B. It is noted that one or more than two inputs are also possible to determine a signal that is used to gate the clock gate circuit 501.

A dashed box 503 indicates a physical area that may be subject to tapping the gated clock signals and therefore may advantageously utilize physical connections of low capacitance such that any tapping any such physical connection may alter the overall capacitance such that a hold time violation occurs.

Figure 6:
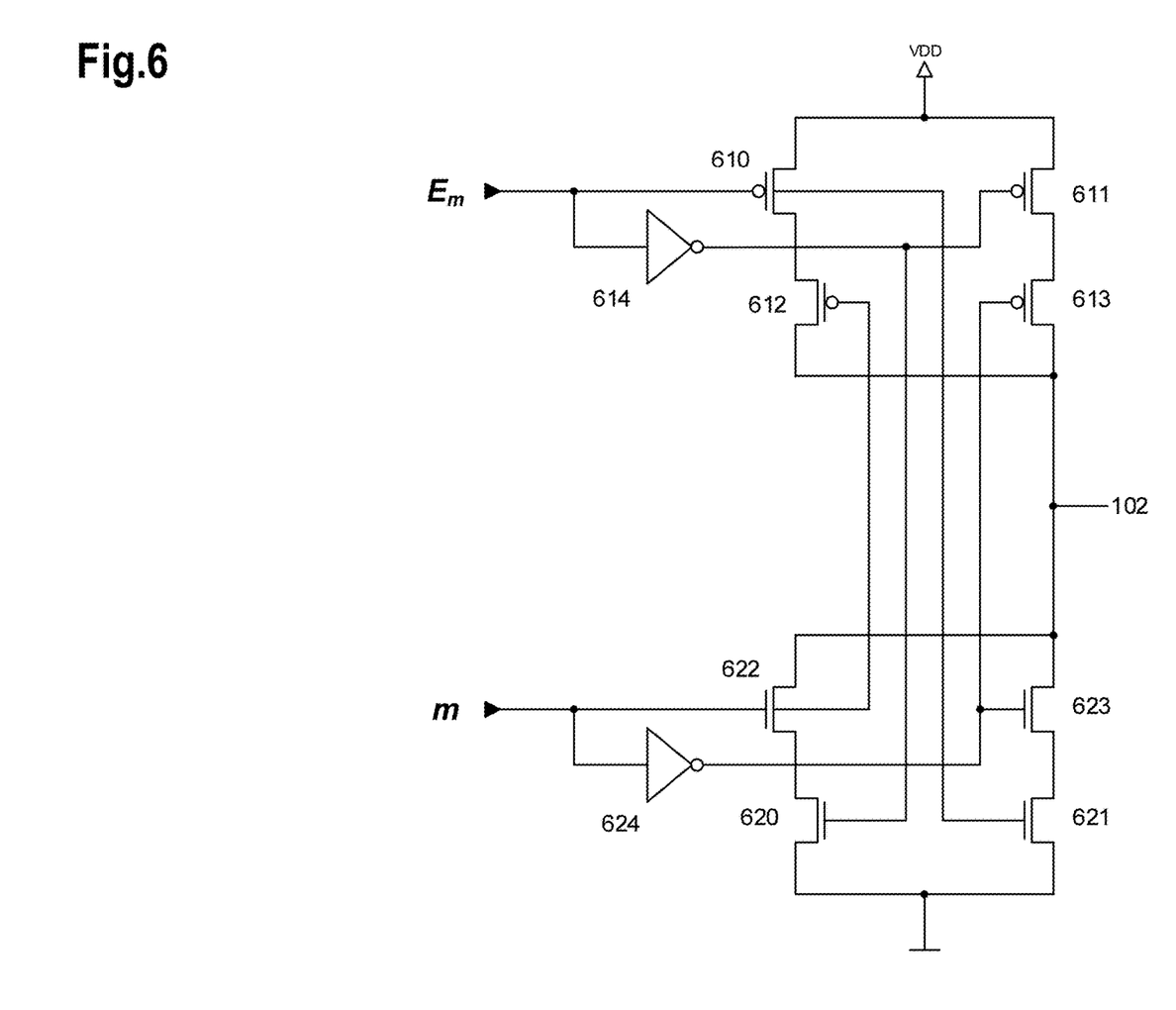
FIG. 6 shows an alternative circuit that can be used as a (de-)masking stage for a clock gate.

FIG. 6 shows an alternative circuit that can be used as a (de-)masking stage for a clock gate. A masked clock enable signal is applied at a node Em and a mask is applied at a node m. The circuit of FIG. 6 suggests an XOR combination of the signals applied to the nodes Em and m. The result of the XOR combination is then applied to the node 102 of FIG. 1. In other words, the NAND decoder stage depicted by blocks 121 and 122 in FIG. 1 can be replaced by the circuitry of FIG. 6. The buffer stage 123, the system clock and the gated clock circuitry shown in FIG. 1 as well as the C2MOS master-slave register according to FIG. 3 may thus be used in combination with the circuit of FIG. 6.

The node Em is connected to the gate of a PMOS 610, to the gate of a NMOS 621 and to the input of an inverter 614. The output of the inverter 614 is connected to the gate of a PMOS 611 and to the gate of a NMOS 620.

The PMOS 610 and a PMOS 612 are connected in series, wherein the PMOS 610 is connected to VDD and the PMOS 612 is connected to the node 102.

The PMOS 611 and a PMOS 613 are connected in series, wherein the PMOS 611 is connected to VDD and the PMOS 613 is connected to the node 102.

The node m is connected to the gate of a NMOS 622, to the gate of the PMOS 612 and to the input of an inverter 624. The output of the inverter 624 is connected to the gate of the PMOS 613 and to the gate of a NMOS 623.

The NMOS 622 and the NMOS 620 are connected in series, wherein the NMOS 622 is connected to the node 102 and the NMOS 620 is connected to ground.

The NMOS 623 and the NMOS 621 are connected in series, wherein the NMOS 623 is connected to the node 102 and the NMOS 621 is connected to ground.

At the node EN, the signal $$\overline{m} \cdot Em + m \cdot \overline{Em}$$

is obtained for CK=0 and stored for CK=1, which can also be noted as m⊕Em, wherein "⊕" indicates the XOR (exclusive-or) operation.

This approach may apply for various Boolean functions f(a, b, . . . ) providing a result that is applied to the node 102.

Figure 7:
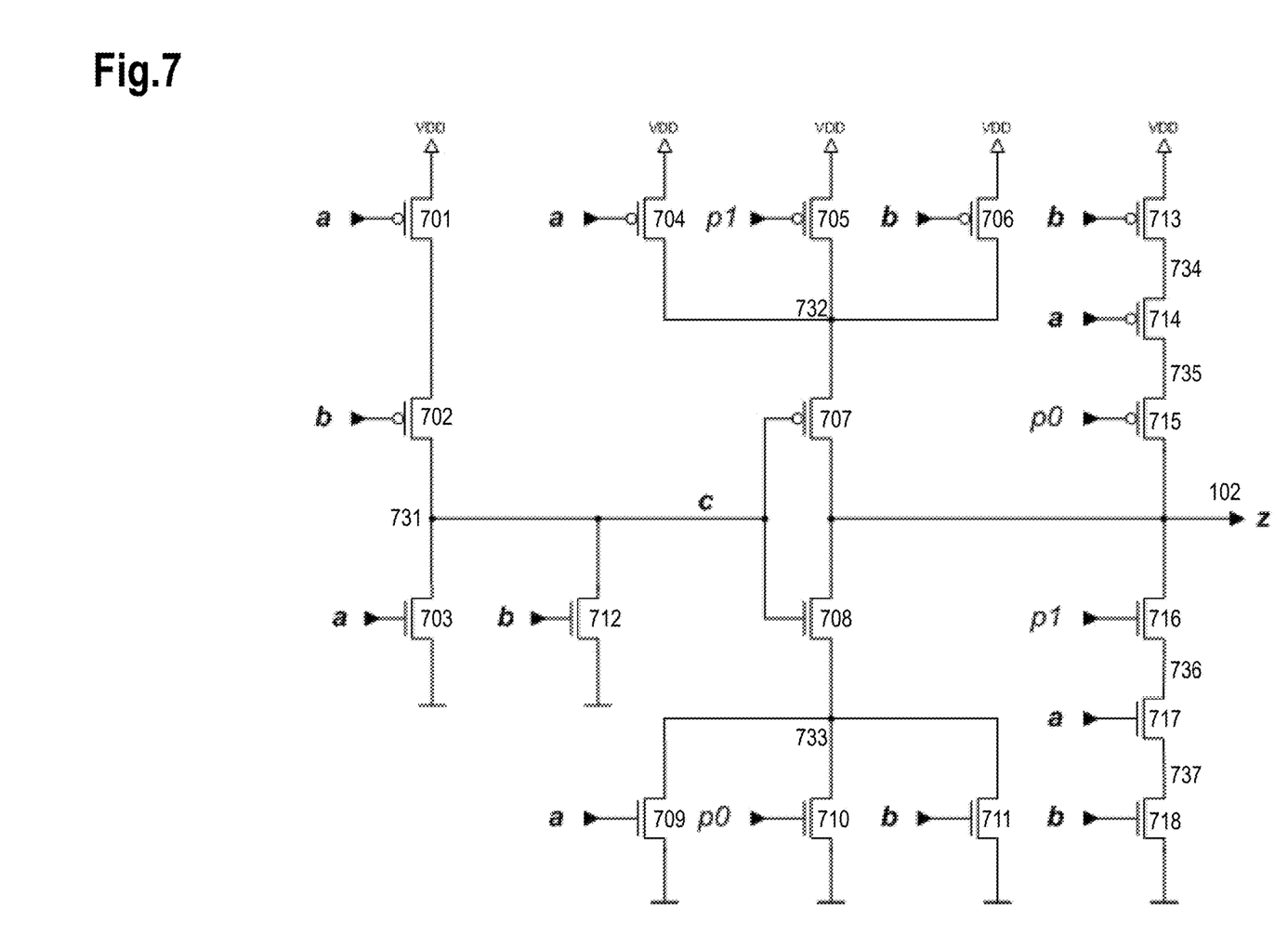
FIG. 7 shows another example of a logical combination of several input signals, wherein the result of said combination is applied to the clock gate circuit via the node 102 of FIG. 1.

FIG. 7 shows another example of a logical combination of several input signals, wherein the result of said combination is applied to the node 102.

An input a is conveyed to the gate of a PMOS 701, to the gate of a PMOS 704, to the gate of a PMOS 714, to the gate of a NMOS 703, to the gate of a NMOS 709 and to the gate of a NMOS 717.

An input b is conveyed to the gate of a PMOS 702, to the gate of a PMOS 706, to the gate of a PMOS 713, to the gate of a NMOS 712, to the gate of a NMOS 711 and to the gate of a NMOS 718.

An input p0 is conveyed to the gate of a PMOS 715 and to the gate of a NMOS 710. An input p1 is conveyed to the gate of a PMOS 705 and to the gate of a NMOS 716.

The PMOS 701 is connected in series with the PMOS 702, wherein the PMOS 701 is connected to VDD and the PMOS 702 is connected to a node 731. The NMOS 703 is connected between the node 731 and ground. The NMOS 712 is connected between the node 731 and ground.

The node 731 is connected to the gate of a PMOS 707 and to the gate of a NMOS 708.

The PMOS 704 is connected between VDD and a node 732, the PMOS 705 is connected between VDD and the node 732 and the PMOS 706 is connected between VDD and the node 732.

The PMOS 707 is connected between the node 732 and the node 102. The NMOS 708 is connected between node 102 and a node 733.

The NMOS 709 is connected between the node 733 and ground, the NMOS 710 is connected between the node 733 and ground and the NMOS 711 is connected between the node 733 and ground.

The PMOS 713 is connected between VDD and a node 734. The PMOS 714 is connected between the node 734 and a node 735. The PMOS 715 is connected between the node 735 and the node 102. The NMOS 716 is connected between the node 102 and a node 736. The NMOS 717 is connected between the node 736 and a node 737. The NMOS 718 is connected between the node 737 and ground.

The circuitry of FIG. 7 can be used as a demasking decoder. Two masked address bits may be applied to the inputs a and b, a decoded signal z is then supplied at the node 102. The signal z is a decoded signal that is used as a clock enable signal (as described in the examples above).

A mask information m=0 may be encoded as (p1, p0)=(1, 0) and m=1 may be encoded as (p1, p0)=(0, 1).

The following table summarizes the possible states for p1 and p0 and the resulting output signal z:

| p1 | p0 | output signal z | m |
|----|----|-----------------|---|
| 0  | 0  | 1               | not used |
| 0  | 1  | a + b           | 1 |
| 1  | 0  | $\bar{a} + \bar{b}(=\overline{a \cdot b})$ | 0 |
| 1  | 1  | $a \cdot \bar{b} + \bar{a} \cdot b$ | not used |

Hence, the mask information m can be used to mask a NAND-gate for a combination of the inputs a and b.

Application in Cryptography

The approach described herein may be employed in hardware-based cryptography accelerators or secured processing systems. It may be used to prevent an attacker from learning about secret access patterns and especially secret data-write patterns into registers or similar storage elements. Due to the small node capacitances of the circuitry described herein, the attacker's ability to obtain information about data-write events is limited. This is an important aspect for algorithms implementing cryptographic schemes like block ciphers, e.g., the Advanced Encryption Standard (AES), or asymmetric cryptography, e.g., Elliptic Curve Cryptography (ECC), RSA or Post-quantum cryptography (PQC) that require protected writing of tables or writing of data to secret memory locations.

An example where addresses are secret information is the Montgomery ladder (see https://en.wikipedia.org/wiki/Elliptic_curve_point_multiplication) that can be used for scalar multiplication in a wide number of elliptic curve cryptosystems.

```
        R_0 ← 0
        R_1 ← P
    for i from m downto 0 do
        if d_i = 0 then
            R_1 ← point_add(R_0, R_1)
            R_0 ← point_double(R_0)
        else
            R_0 ← point_add(R_0, R_1)
            R_1 ← point_double(R_1)
    return R_0
```

In the Montgomery ladder, a secret key bit determines whether the result of a function point_add($R_0$, $R_1$) is written to $R_1$ or $R_0$ (similar for point_double($R_1$)). With the approach as suggested herewith, a write operation can be protected as an attacker is no longer able to successfully probe the write enable signal of a register-file. Additional protection can be achieved by time randomization of the write operation: in this case the time when the write enable signal is asserted, is randomized. A masked decoder stage can be used in combination with key material that is stored in shares. Thus, it is not necessary to combine the shared key as the share and mask can be fed into the decoder gate.

Another exemplary use case is the register-file of a processor subsystem. Such register-file may contain 32 registers that are each 32-bits wide. When executing a cryptographic operation on data stored in such registers, an attacker may try to initiate probing to find out which registers are written. The solution described herein allows protecting the write enable signals thereby blocking the attacker from obtaining such information.

An additional benefit of the proposed approach is that the probability is high that a write operation to a register or register file will be disturbed by a probing needle placed on the circuitry due to the limited capacity (violating the hold time as described above). Hence, the solution described herein may be combined with other methods that compute a checksum over a computation or that perform a read back of data. If such an integrity check is performed during a critical computation, chances are high that a probing attack is not successful.

Although various exemplary embodiments of the disclosure have been disclosed, it will be apparent to those skilled in the art that various changes and modifications can be made which will achieve some of the advantages of the disclosure without departing from the spirit and scope of the disclosure. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the disclosure may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A storage element configured to operate based on a system clock signal, comprising:
    a clock gating circuitry configured to generate a gated clock signal based on:
        at least one Boolean signal, and
        the system clock signal or a preprocessed system clock signal,
            wherein the gated clock signal comprises a true gated clock signal and an inverse gated clock signal, and the clock gating circuitry comprises physical connections of small capacitance such that tapping of at least one of the physical connections results in a hold-time violation.

2. The storage element according to claim 1, wherein the clock gating circuitry or the storage element comprises a tri-state circuitry.

3. The storage element according to claim 2, wherein the tri-state circuitry comprises a C2MOS or transmission gate circuitry.

4. The storage element according to claim 1, wherein the at least one Boolean signal is provided by a Boolean circuitry, which is based on at least two input signals and provides an output signal as a function of the at least two input signals.

5. The storage element according to claim 4, wherein the Boolean circuitry is realized for each combination of binary values associated with the at least two input signals.

6. The storage element according to claim 1, further comprising a flip-flop, a storage device that is controllable by complementary, gated clock signals, a memory device, a register, or a latch.

7. The storage element according to claim 1, further comprising a buffer stage configured to provide:
   a first clock signal that is in-phase with the system clock signal, and
   a second clock signal that is inverted with respect to the phase of the system clock signal.

8. The storage element according to claim 7, wherein the buffer stage is configured to supply the first clock signal and the second clock signal to the clock gating circuitry as the preprocessed system clock signal.

9. The storage element according to claim 1, wherein the small capacitance is about a few femto Farad.

10. The storage element according to claim 1, wherein the small capacitance is below 10 femtofarad.

11. The storage element according to claim 1, wherein the storage element is part of or used in association with a hardware-based cryptography accelerator or a secured processing system.

12. The storage element according to claim 11, wherein the hardware-based cryptography accelerator or the secured processing system provides a cryptographic scheme selected from a group consisting of: a block cipher, a symmetric cryptographic algorithm, an asymmetric cryptograph algorithm, Elliptic Curve Cryptography, and a Post-quantum cryptography.

13. A hardware-based cryptography accelerator or a secured processing system comprising at least one storage element according to claim 1.

14. A method for operating the storage element according to claim 1.

* * * * *